United States Patent [19]

Eshraghian et al.

[11] 4,234,923
[45] Nov. 18, 1980

[54] VEHICLE DETECTION SYSTEMS

[75] Inventors: Kamran Eshraghian, Hectorville; Robert E. Bogner, College Park, both of Australia

[73] Assignee: U.S. Philips Corporation, New York, N.Y.

[21] Appl. No.: 902,929

[22] Filed: Jun. 22, 1978

[51] Int. Cl.³ .............................................. G06G 7/76
[52] U.S. Cl. .................................. 364/436; 340/38 L; 364/438
[58] Field of Search ............... 364/565, 436, 437, 438; 340/38 L

[56] References Cited

U.S. PATENT DOCUMENTS

| | | | |
|---|---|---|---|
| 2,999,999 | 9/1961 | Bartelink | 364/438 X |
| 3,626,413 | 12/1971 | Zachmann | 364/438 X |
| 4,023,017 | 5/1977 | Ceseri | 364/438 X |

Primary Examiner—Edward J. Wise
Attorney, Agent, or Firm—Simon L. Cohen

[57] ABSTRACT

In the disclosed system the speed of a vehicle passing over the sensing coils of the detection system is determined by sampling the envelope voltages occurring during the leading edge portion of the disturbance in the envelope of the received signal produced by an approaching vehicle. This is accomplished by sampling the envelope voltage at a first instant at which the slope of the leading edge is at a maximum and at a second instant occurring at a fixed time interval subsequent to the first instant. The voltage sampled at the first instant is then subtracted from the voltage sampled at the second instant and the difference divided by a voltage sampled at a third instant at which the slope of the leading edge first starts to decrease to produce a signal indicative of the vehicle speed.

4 Claims, 4 Drawing Figures

VEHICLE DETECTION SYSTEMS

The following statement is a full description of this invention including the best method of performing it known to us.

The present invention relates to vehicle detection systems wherein a transmitter supplying a continuous wave signal is coupled to a receiver via sensing means so that the approach of a sensed vehicle produces a positive going excursion of the envelope of the received signal.

Vehicle detection systems of the kind to which the invention relates are known.

In one known system, the sensing means comprises a transmitting coil forming part of the transmitter and inductively coupled to a receiving coil forming part of the receiver, the sensing means being located beneath the road surface. As a vehicle enters the zone of influence, the inductive coupling between the transmitting coil and the receiving coil is influenced and causes a corresponding change in the level of the received signal.

An object of the present invention is to provide a system for detecting the speed of a sensed vehicle.

According to the invention, the vehicle speed detection system comprises a transmitter supplying a continuous wave signal which is coupled to a receiver via sensing means so that the approach of each sensed vehicle produces a positive going excursion or disturbance in the envelope of the received signal. In response to each said positive going excursion, electrical quantities substantially equivalent to $V_2-V_1$ and $Vp$ are respectively derived in the receiver from the received signal. From these quantities a further quantity is formed substantially equivalent to the expression $(V_2-V_1/Vp)$ where;

Vp is the envelope voltage of the received signal at an instant Ip during the leading edge portion of each positive going excursion at which the first-occurring marked decrease of the slope of the leading edge occurs less the envelope voltage prior to the positive going excursion, $V_1$ is the envelope voltage of the received signal at an instant $I_1$ at which the slope of the leading edge is substantially at its maximum during the leading edge portion preceding the instant Ip and, $V_2$ is the envelope voltage of the received signal at an instant $I_2$ occurring at a fixed time later than the instant $I_1$ and preceding the instant Ip.

Preferably, the envelope voltage of the received signal is sampled at the instants Ip, $I_1$ and $I_2$ during the leading edge portion of each positive going excursion to obtain the voltages Vp, $V_1$ and $V_2$, the instants Ip, $I_1$ and $I_2$ being determined by the characteristics of a derived signal corresponding to the differential of the envelope of the received signal.

In one form, the system comprises sampling means for deriving a sample voltage corresponding to the voltage $V_1$ of each positive going excursion by sampling the envelope voltage of the received signal under the control of a peak detection means fed by a differentiating means forming a differential signal corresponding with the differential of the envelope of the received signal. The peak detection means detects differential signal peaks to initiate sampling at the instant $I_1$ during each positive going excursion and sampling means for deriving sample voltages corresponding to the voltage Vp of each positive going excursion by sampling the envelope voltage of the received signal under the control of a zero crossover detection means fed by a differentiating means forming a differential signal corresponding to the differential of the envelope of the received signal. The zero crossover detection means detects zero crossover points of the differential signal to initiate sampling at the instant Ip of each positive going excursion.

In another form, the system comprises sampling means for deriving sample voltages corresponding to the voltages $V_1$ and $V_p$ of each positive going excursion by sampling the envelope voltage of the received signal under the control of a zero crossover detection means fed by a double differentiating means forming a double differential signal corresponding to the differential of the differential of the envelope of the received signal. The zero cross-over detection means detects zero crossover point of the double differential signal to initiate sampling at the respective instants $I_1$ and Ip of each positive going excursion.

In vehicle detection systems of the kind to which the invention relates, the aforementioned positive going excursion of the envelope of the received signal may be regarded as an amplitude modulation of the continuous wave signal, the slope of the positive going excursion being determined by the characteristics of the particular sensed vehicle. The shape of the excursion of the envelope so formed can be referred to as the "signature waveform" of the vehicle in question.

The present invention is based upon the observation that the initial portion of the "signature waveform" is predictable within narrow limits for all vehicles whereas subsequent to the initial period the signature waveform is unpredictable and depends upon the characteristics of the individual vehicle. The invention is also based upon the further observation that the voltage reached (Vp) as the "signature waveform" levels off at the end of its initial portion when divided by the slope of the initial portion is relatively constant despite the characteristics of the sensed vehicle.

The invention will now be further described with reference to the accompanying figures, in which.

Figure 1:
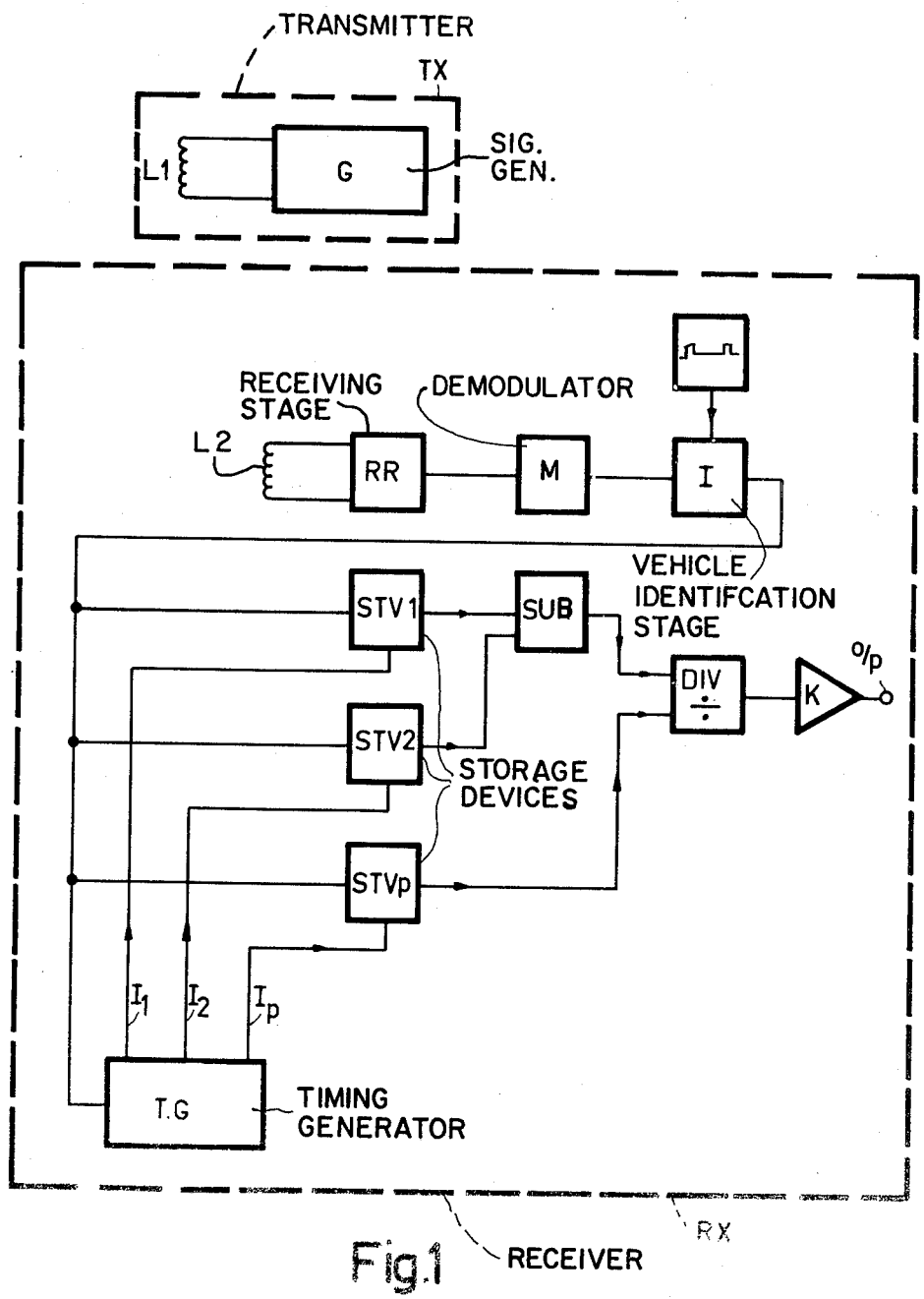
FIG. 1 is a block schematic diagram of a system according to the invention.

The system of FIG. 1 comprises a transmitter TX and a receiver RX. The transmitter coil L1 of the transmitter TX and the receiving coil L2 of the receiver RX are each located just beneath the surface of a roadway or traffic lane and spaced apart from each other with their respective coil axes substantially in alignment and orthogonal to the roadway or traffic lane so that the inductive coupling between the coil L1 and the coil L2 is influenced by the presence of a vehicle in the roadway or lane.

The generator G of the transmitter TX produces in known manner a continuous wave signal of constant frequency (e.g. 100 khz) which is fed to the coil L1 and radiated thereby.

Signals received by the receiving coil L2 are fed to the input of the receiving stage RR which selects and amplifies in a known manner incoming signals within a predetermined bandwidth including the frequency of the signal radiated by the coil L1. Thus, the output signal of the stage RR is a continuous wave signal which is amplitude modulated whenever a vehicle approaches and/or passes over the sensing means formed by the coils L1 and L2.

The stage M, following the receiving stage RR, processes the received signal by demodulation or otherwise so that a signal is produced at its output corresponding with the envelope of the received signal.

The stage I, following the stage M, further processes the output signal of the stage M by identifying the occurrence of a positive going excursion of the envelope of the received signal due to the approach of a vehicle as distinct from a positive going excursion due to other causes such as a changed environmental condition. Such identification systems are described in the applicant's co-pending Australian Patent Application No. PD0001 which corresponds to the co-pending U.S. application Ser. No. 903,185, filed June 22, 1978. The stage I identifies positive going excursions of the envelope of the received signal having a sharply rising leading edge produced by the approach of a vehicle and without such recognition produces no output but upon such recognition produces an output signal coinciding with the difference between a stored sample voltage and the envelope voltage, the stored sample voltage being a voltage corresponding with that of the envelope voltage itself at an initial portion of the sharply rising leading edge.

Figure 2:
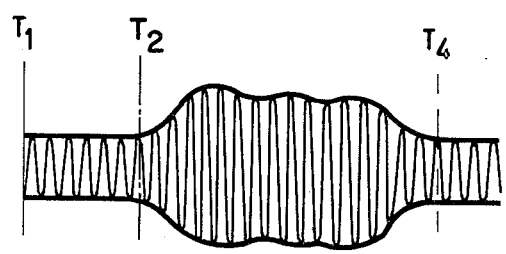
FIGS. 2 to 4 illustrate diagrammatically waveforms produced at various parts of the system of FIG. 1.

FIG. 2 is a graphical indication of a signal produced at the output of the stage RR. Between the instants T1 and T2 there is no vehicle within the zone of influence and between the instants T2 and T4 a vehicle is approaching and passing over the sensing means formed by the coils L1 and L2.

Figure 3:
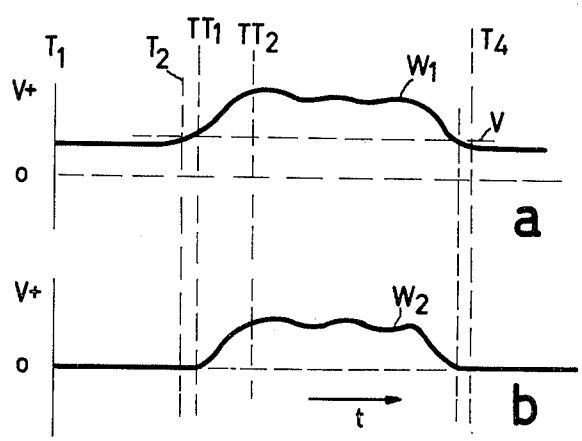

FIG. 3a is a graphical indication of the resultant signal produced at the output of the stage M, between the instants T2 and T4 there being a positive going excursion due to the passage of a vehicle.

FIG. 3b is a graphical illustration of the resultant signal produced at the output of the stage I. The waveform W2 illustrated in FIG. 3b is the difference between the waveform W1 of FIG. 3a and the stored voltage indicated by the dotted line V of FIG. 3a.

Figure 4:
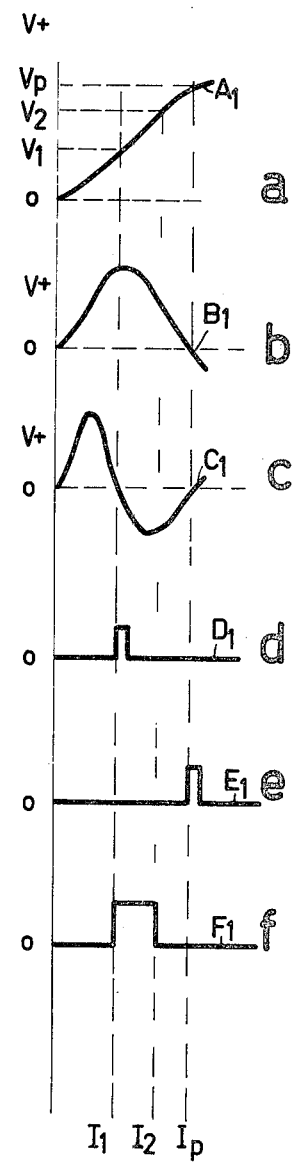

FIG. 4a shows graphically by means of the voltage waveform A1 the change in level of the envelope of the received signal approximately between the instants TT1 and TT2 i.e. during the leading edge portion of the signal of FIG. 3a.

FIG. 4b shows graphically by means of the waveform B1 a voltage representing the differential of the voltage of the waveform A1.

FIG. 4c shows graphically by means of the waveform C1 a voltage representing the differential of the waveform of the voltage of the waveform B1.

FIG. 4d shows graphically by means of the waveform D1 a derived pulse, the timing of which may be controlled by the voltage waveform B1 or which may alternatively be controlled by the voltage waveform C1.

FIG. 4c shows graphically by means of the waveform E1 another derived pulse, the timing of which may be controlled by the voltage waveform of B1 or which may alternatively be controlled by the voltage waveform C1.

FIG. 4f shows graphically by means of the waveform F1 a pulse of fixed duration, the timing of which is controlled by the pulse of waveform D1.

Referring once more to FIG. 1, the output signal by way of example as indicated by the voltage waveform W2 of FIG. 3b, the leading edge portion between the instants TT1 and TT2 thus coinciding with the waveform of FIG. 4a, is produced at the output of the stage I and is fed to the stages STV1, STV2 and STVP and also to the timing generator TG. The stages STV1, STV2 and STVP will, upon command by timing pulses, store at their respective outputs in known manner the voltage present at their respective inputs at the occurrence of the respective timing pulses until occurrence of the next timing pulse applied thereto.

The timing generator TG, under the control of the waveform W2 produces timing pulses coinciding with the instants T1, I2 and IP and the timing pulses are applied respectively to the stages STV1, STV2 and STVP to command storage at these instants. Thus, the stage STV1 stores the voltage V1, the stage STV2 stores the voltage V2 and the store STVP stores the voltage VP in response to passage of a vehicle. The outputs of the stages STV1 and STV2 are applied to the subtractor SUB producing at its output V2-V1.

The output of the subtractor stage SUB is applied to the dividing stage DIV to which the voltage VP from the store STVP is also applied. The divider operates in known manner to divide the voltage V2-V1 by the voltage VP. Accordingly, the output voltage of the dividing stage DIV is substantially equivalent to (V2-V1/Vp), this voltage being substantially proportional to the speed of the sensed vehicle from which the waveform W2 has resulted.

The output of the divider stage DIV is fed via an amplifier having an amplification equivalent to a constant K thus producing at the output terminal OP a voltage also proportional to the speed of the sensed vehicle and in terms of kilometers per hour.

The timing pulse generator TG may take any one of several different forms. In one form shown in FIG. 5, the waveform A1 from stage I is applied via line 14 to differentiator 10 where it is differentiated to produce the waveform B1. The waveform B1 at the output of differentiator 10 is fed to the peak detector 11 which determines the instant at which the waveform B1 reaches its maximum and produces a timing pulse coinciding with the instant I1 as indicated by the waveform D1 in FIG. 4d. In addition, the waveform B1 at the output of differentiator 10 is applied to a zero crossover detector 13 which, by means of known zero-crossover detection techniques, determines the instant of zero-crossover of the waveform B1 and produces a timing pulse coinciding with the instant IP as indicated by the waveform E1 in FIG. 4e.

Figure 6:
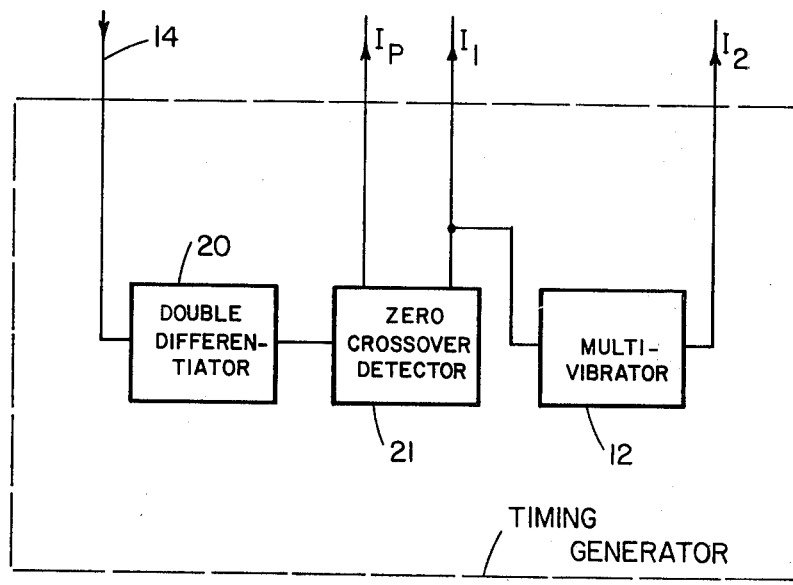
FIG. 6 is a block schematic diagram of another embodiment of the timing generator shown in FIG. 1.

In another form of the timing generator TG shown in FIG. 6, the waveform A1 is applied via line 14 to a double differentiator 20 where it differentiated twice to produce the waveform C1, shown in FIG. 4c, which corresponds to the second differential of waveform A1. The zero-crossover detector 21, connected to the output of differentiator 20 determine the first and second crossovers of waveform C1, which correspond to instants I1 and IP, respectively, and produces timing pulses corresponding to instants I1 and IP as indicated by the respective waveforms D1 and E1 in FIGS. 4d and 4e respectively.

Figure 5:
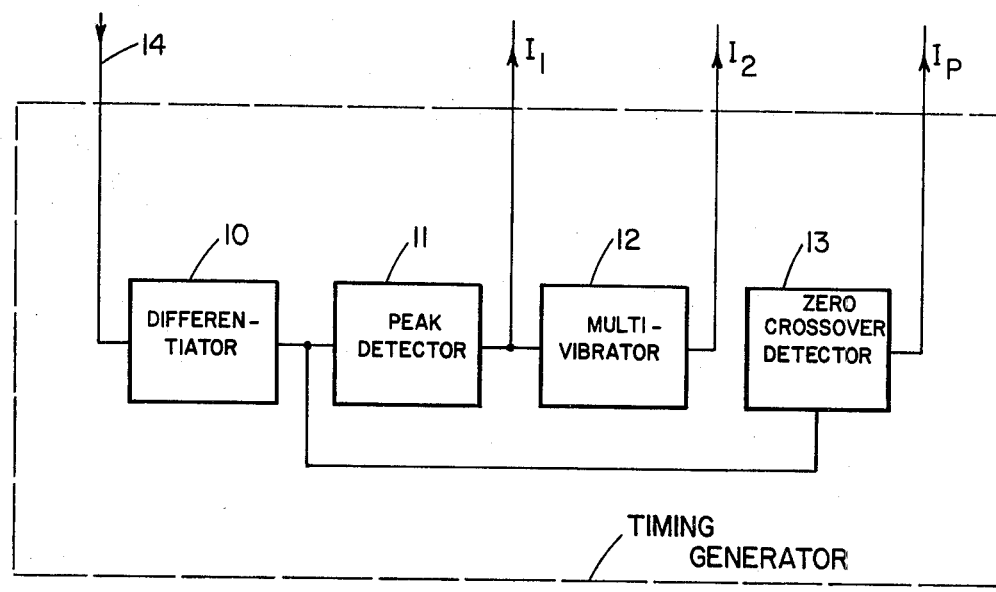
FIG. 5 is a block schematic diagram of the timing generator shown in FIG. 1.

In both the embodiment of FIG. 5 and FIG. 6, a monostable multivibrator 12 or equivalent device may be employed to determine the instant I2 and produce a timing pulse at the instant I2 at a fixed instant following I1. The trailing edge of the pulse of the waveform F1 of FIG. 4f may be employed for this purpose.

The present invention has been described loosely in terms of analogue techniques but lends itself particularly to the application of digital techniques throughout and the necessary modifications to achieve operation employing digital techniques will be apparent to persons skilled in the art.

The invention is by no means limited to the embodiments of the invention schematically described in relation to FIGS. 1, 2, 3 and 4 of the accompanying drawings.

Many variations and modifications to the embodiment of the invention disclosed herein but employing the principles of the invention will be readily apparent to persons skilled in the art and it is intended to include such variations within the scope of the present invention.

What is claimed is:

1. A vehicle detection system comprising a transmitter for supplying a continuous wave signal, a receiver and sensing means for coupling said continuous wave signal to said receiver so that the approach of a vehicle produces a disturbance having a leading edge with a changing voltage level in the envelope of the signal received by said receiver, said receiver including first means for deriving from said received signal a first signal representative of the envelope voltage at a first instant during the leading edge portion of said disturbance at which the slope of the leading edge first starts to markedly decrease less a voltage corresponding approximately to the envelope voltage prior to said disturbance produced by the approach of a vehicle, second means for deriving from said received signal a second signal representative of the envelope voltage of the received signal at a second instant at which the slope of the leading edge is substantially at its maximum, third means for deriving from said received signal a third signal representative of the envelope voltage of the received signal at a third instant occurring at a fixed time period subsequent to said second instant and prior to said first instant, means for producing from said third and second signals a fourth signal representative of the difference between the envelope voltages at said third and second instants and means for dividing said fourth signal by said first signal to obtain an output signal indicative of the velocity of the vehicle.

2. The system according to claim 1 wherein said first, second and third signals are representative of the voltages of a positive going excursion portion of the envelope at said first, second and third instants, respectively.

3. The system according to claim 1 or 2 wherein said receiver includes means for differentiating the envelope of said received signal to thereby generate a differential signal corresponding to the differential of the envelope, means coupled to said differentiating means for detecting a peak in said differential signal and thereupon generating a first timing signal at said second instant, said second deriving means including means coupled to said peak detection means for sampling the voltage of the envelope upon occurrence of said first timing signal, and means coupled to said differentiating means for detecting the zero crossover of said differential signal and generating thereupon a second timing signal at said first instant, said first deriving means including means, coupled to said crossover detection means, for sampling the envelope voltage upon occurrence of said second timing signal.

4. The system according to claims 1 or 2 wherein said receiver includes means for differentiating twice the envelope of said received signal to thereby obtain a double differential signal corresponding to the second differential of the envelope, means coupled to said differentiating means for detecting the first and second zero crossover points of the double differential signal which correspond to said second and first instants, respectively, and thereupon generating a first and second timing signal, respectively, and wherein said second and first deriving means each includes means for sampling the envelope voltage upon occurrence of said first and second timing signals, respectively.

* * * * *